United States Patent [19]
Reimbert

[11] 4,372,466
[45] Feb. 8, 1983

[54] VESSEL FOR STORING PARTICULATE MATERIALS AND METHOD OF EMPTYING

[76] Inventor: André Reimbert, 67, Boulevard de Reuilly, F-75012 Paris, France

[21] Appl. No.: 208,637

[22] Filed: Nov. 20, 1980

[30] Foreign Application Priority Data

Nov. 21, 1979 [FR] France .............. 79 28683

[51] Int. Cl.³ .................................... B65G 65/34
[52] U.S. Cl. .............................. 222/482; 222/488; 222/564
[58] Field of Search ............... 222/482, 488, 564

[56] References Cited

U.S. PATENT DOCUMENTS

| | | | |
|---|---|---|---|
| 2,805,802 | 9/1957 | Strong | 222/564 |
| 2,907,501 | 10/1959 | Laird | 222/564 X |
| 3,035,739 | 5/1962 | Berg | 222/564 X |
| 3,233,796 | 2/1966 | Reimbert | 222/564 X |

FOREIGN PATENT DOCUMENTS

| | | | |
|---|---|---|---|
| 955447 | 1/1950 | France | 222/564 |
| 7704918 | 2/1979 | Sweden | 222/564 |

Primary Examiner—Joseph J. Rolla
Attorney, Agent, or Firm—Young & Thompson

[57] ABSTRACT

A first bottom discharge opening provided at the lower end of a storage vessel and fitted with a shut-off valve is adjacent to a second bottom discharge opening fitted with a shut-off valve. The second opening is joined to an emptying tube which extends vertically within the vessel and has a top orifice located at a level between ¼ and ¾ of the total height of the vessel. At the time of final emptying of the lower portion of the vessel through the first discharge opening, the curve of overpressures resulting from the emptying operation is close to the curve of static pressures generated by all the material stored within the vessel when this latter is full. Thus there is no need for any wall reinforcement and construction costs are appreciably reduced.

8 Claims, 10 Drawing Figures

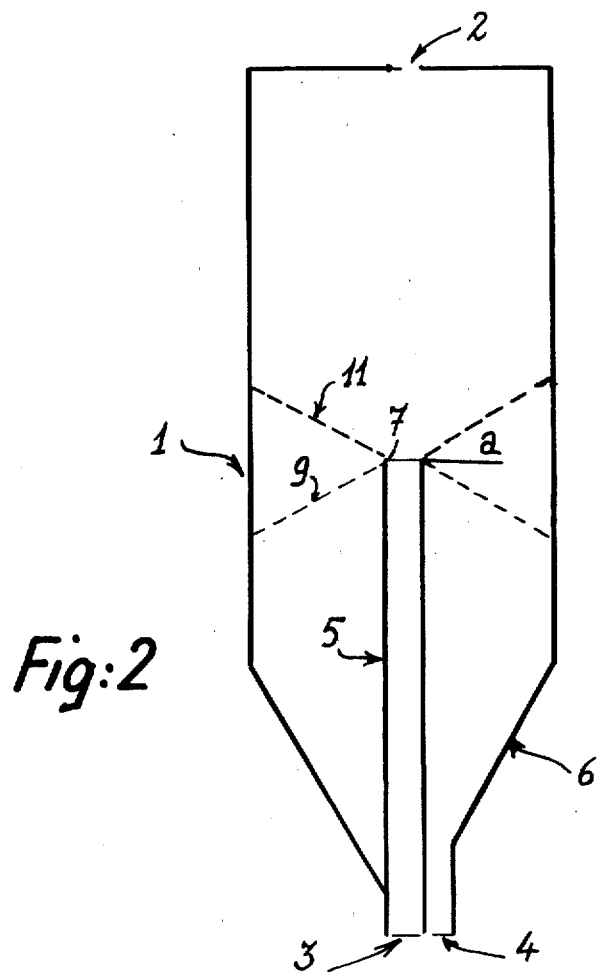
Fig:2
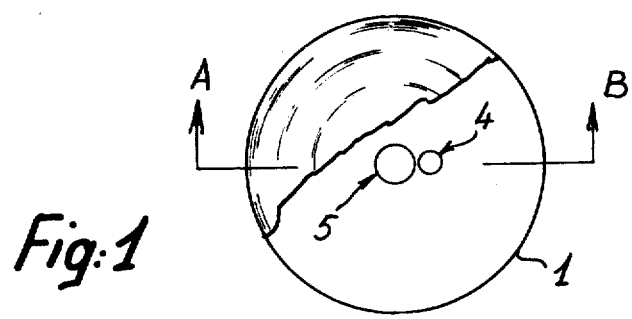
Fig:1

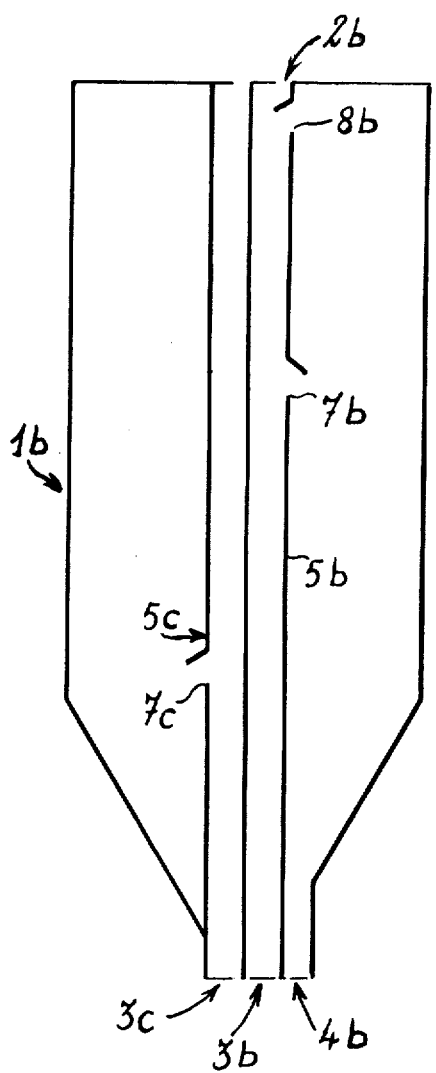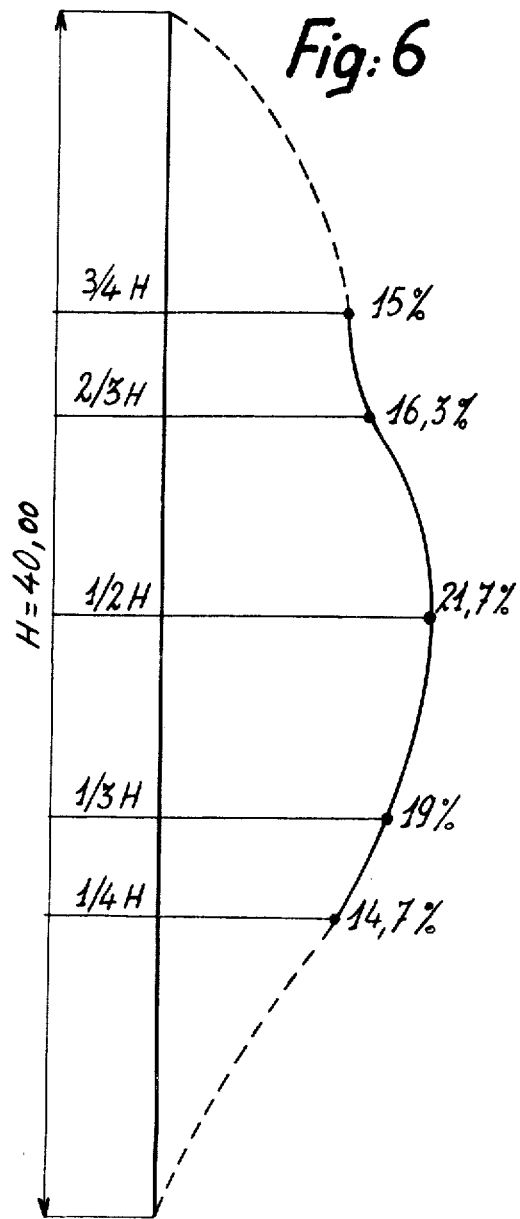

VESSEL FOR STORING PARTICULATE MATERIALS AND METHOD OF EMPTYING

This invention relates to vessels for the storage of materials in granular or powdered form. Vessels of this type are of more or less substantial unitary capacity and have small dimensions in the horizontal plane with respect to their height in the case, for example, of cylindrical vessels having a height within the range of two to five times the diameter or at least six times the diameter.

It is known that emptying of a vessel of this type through its bottom outlet produces overpressures which are distinctly higher than the static pressure exerted by the stored material in the state of rest. The resultant pressure rise progressively increases in value from the top to the bottom of the vessel and attains higher values as the height of the vessel is greater; this finding emerges from the experimental and theoretical studies which have been made during the last few decades. The vessel wall must accordingly be reinforced in order to afford resistance to the pressure rises mentioned above. However, reinforcement has the effect of substantially increasing the cost price of the vessel wall by at least 50%, the discharge pressure being approximately 1.5 to 3 times the static storage pressure.

For the reason just stated, the present invention is directed to a storage vessel which is so designed as to avoid the need for any wall reinforcement and thus to permit the achievement of an appreciable economy in construction costs.

To this end and in accordance with the invention, a storage vessel having a bottom discharge opening formed in the lower end of said vessel and fitted with a shut-off valve is distinguished by the fact that the lower end of said vessel is provided with a second discharge opening fitted with a shut-off valve, there being connected to said second discharge opening a vertical emptying tube which extends within the vessel and the top orifice of which is located at a level between $\frac{1}{4}$ and $\frac{3}{4}$ of the total height of the vessel. Thus said level is such that, at the time of final emptying of the lower portion of the vessel through the discharge opening in the lower end of said vessel, the curve of overpressures resulting from said emptying operation is close to the curve of static pressures generated by all the material stored within the vessel when this latter is full.

In regard to the method adopted for emptying said vessel, said method essentially consists in performing the emptying operation in two stages, viz:

a first stage during which the discharge opening provided at the lower end of the vertical emptying tube is opened while the other discharge opening provided in the lower end of the vessel is maintained in the closed position until the quantity of material located above the top emptying orifice of the vertical tube has been completely discharged from said tube via said orifice;

then a second stage during which the discharge opening provided in the lower end of the vessel is opened in order to discharge through said opening the material contained in the vessel below the top emptying orifice of the vertical tube.

However, taking into account the particular level provided for the top emptying orifice of the vertical tube, the curve of overpressures resulting from final emptying of the bottom portion of the vessel is close to the curve of static storage pressures. Under these conditions, it serves no useful purpose to provide a substantial reinforcement of the vessel walls by reason of the discharge overpressures since the wall thickness need only be calculated to ensure that the vessel walls are capable of affording resistance to static storage pressures which may be partially and only slightly increased in certain instances.

In an alternative embodiment of the storage vessel under consideration, provision is made for two vertical emptying tubes connected to two discharge openings which are separate and distinct from the opening provided in the lower end of said vessel, the top orifices of said two tubes being located at different levels. Thus the top orifice of one tube is located at a level within the range of $\frac{1}{8}$ to $\frac{1}{4}$ of the total height of the vessel from the lower end whilst the top orifice of the other tube is located at a level within the range of $\frac{3}{8}$ to 4/8 of the total height of the vessel from the lower end.

However, in another embodiment which is more advantageous, the storage vessel in accordance with the invention is also designed to improve the conditions of filling of said vessel and especially to reduce the height of fall of grains at the time of filling in order to prevent damage or degradation of the grains.

To this end, the vertical emptying tube extends above its top emptying orifice located at a level between $\frac{1}{4}$ and $\frac{3}{4}$ of the total height of said vessel and preferably at one-half of said height and the upper end of said tube is connected to a single filler opening provided in the top end-wall of the vessel whilst a discharge orifice is formed in the vertical tube near the upper end thereof.

Thus the grains are poured into the vertical tube during the filling operation and, in an initial stage, are discharged from the tube through the orifice which is provided for subsequent emptying and is located at an intermediate point of its height. Under these conditions, the height of fall of grains is considerably reduced. When the quantity of grains within the vessel has reached the level of the intermediate orifice mentioned above, the grains which have been poured into the vertical tube are discharged from this latter through the outlet orifice provided at the top end of the tube.

When provision is made for two vertical emptying tubes, each tube has a portion which extends above the emptying orifice and the upper ends of the two tubes are in that case connected to the single filler opening of the corresponding vessel, at least one of said two tubes being provided with an outlet orifice at its upper end.

These and other features of the invention will be more apparent upon consideration of the following description and accompanying drawings, wherein:

FIG. 1 is an overhead plan view with a portion broken away and showing a first embodiment of a storage vessel in accordance with the invention;

FIG. 2 is a vertical sectional view taken along the plane AB of FIG. 1;

FIG. 6 shows the curve of variations in economy of construction as a function of variations in level of the intermediate orifice of the vertical emptying tube;

FIG. 10 is a view which is similar to FIG. 3 but shows another embodiment of the storage vessel in accordance with the invention.

Figure 3:
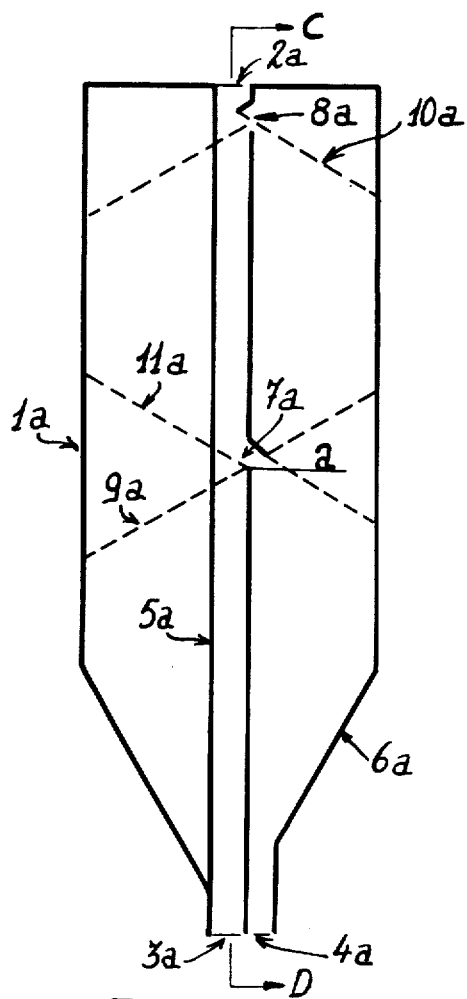
FIG. 3 is a view which is similar to FIG. 2 but shows another embodiment of the storage vessel in accordance with the invention.

The storage vessel 1 which is illustrated by way of example in FIGS. 1 and 2 has a cylindrical shape. However, said vessel could have either a cross-section in the shape of a polygon which may or may not be a regular polygon or a cross-section of oval shape. Provision is made at the top of said vessel for a filler opening 2 whilst the bottom portion of its lower end-wall 6 has two separate discharge openings designated respectively by the reference numerals 3 and 4 and each fitted with a shut-off valve. The lower end of said vessel can assume the shape of a hopper as is the case in the example illustrated or else may be designed in the form of a flat end-wall.

In accordance with the invention, a vertical emptying tube 5 is connected to one of the two discharge openings, namely the opening 3 in the example illustrated. Said tube extends within the vessel and is therefore placed within the interior of the stored material when the vessel is completely filled.

In accordance with an essential feature, the top orifice 7 of said tube, which is intended to constitute a discharge opening, is located at a predetermined level a as will be explained hereinafter in greater detail. Said level must be within the range of $\frac{1}{4}$ to $\frac{3}{4}$ of the total height of the vessel and should preferably be located at a point corresponding to half its height.

The addition of said emptying tube makes it possible to carry out the vessel-emptying operation in two stages.

A first stage consists in opening the valve of the discharge opening 3 to which the vertical tube 5 is connected while maintaining the valve of the second discharge opening 4 in the closed position. Under these conditions, discharge of grains can take place only through the vertical tube 5. The grains located within said tube as well as those contained within the vessel 1 above the level of the top emptying orifice 7 of said tube fall downwards through the lower portion of this latter and are discharged from the vessel. When the flow of grains is interrupted, the mass contained within the storage vessel fills only the lower portion of this latter or in other words the portion located below the level of the top emptying orifice 7 of the vertical tube 5. However, this mass then forms a crater 11 within the vessel.

A point worthy of note is that, during this initial emptying stage, overpressures have appeared only in the grain layers located above the level a of the top emptying orifice 7 of the vertical tube 5. In fact, during this first stage, the grains of the lower layers or in other words the layers located between said level a and the lower end of the vessel have remained absolutely static and therefore have not produced any overpressure. Under these conditions, that portion of the vessel wall which is located between the level a and the lower end 6, and which is in any case subjected to the highest static pressure, is not subjected to any discharge overpressure. Thus no reinforcement is required for this stage in the portion of wall just mentioned.

In the second stage of the vessel-emptying operation, the valve employed for shutting-off the second discharge opening 4 provided in the lower end 6 of the vessel is opened. Under these conditions, the grains located below the level a of the top emptying orifice 7 of the vertical tube 5 can pass directly out of the vessel 1 via the opening 4. However, since the height of the mass of grains which has thus been set in motion is reduced with respect to the height of the vessel 1, the static pressures generated by these grains are also reduced; and even if allowance is made for the overpressures which occur at the time of emptying of the corresponding grain layers, the pressures remain lower than the static pressures generated earlier by the entire quantity of grains initially stored up to the full height of the vessel 1, or increase only to a slight extent.

Figure 5:
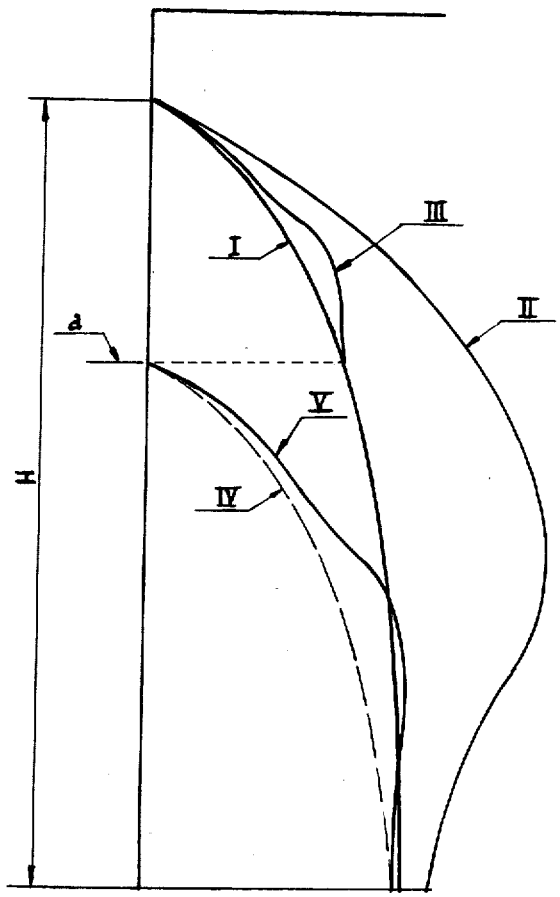
FIG. 5 is a graphical representation of the pressure curves which relate to the pressures developed within said storage vessel.

Moreover, the different curves of FIG. 5 serve to gain a clear idea of the stresses to which the vessel wall is in fact subjected during the different stages described in the foregoing. These curves correspond to the graphical representations of the static pressures and discharge overpressures, the depths at each level considered from the top of a vessel having a total height H being shown as ordinates and the pressures being shown as abscissae.

Among the representations thus plotted in FIG. 5, curve I represents the static pressures exerted by the stored material on the wall of the vessel 1. Curve II corresponds to the discharge overpressures which would be produced within a vessel of a similar type but not fitted with a filling and emptying device in accordance with the invention. In fact, it is this curve (curve II) which is taken into consideration in the calculation of wall thicknesses of conventional storage vessels.

Curve III represents the overpressures exerted within the vessel in accordance with the invention by the stored material between the top of the vessel and the level a when said vessel is emptied through the top orifice 7 of the vertical tube 5 and the bottom discharge opening 3. It is worthy of note that the static pressures (which are in any case of lowest value from the top to the bottom of the vessel) are increased to a slight extent and entail the need only for a slight and local reinforcement of the vessel wall. It is also observed that said curve III remains well below curve II, thus proving the economical advantage of the device in accordance with the invention.

So far as curve IV is concerned, this curve represents the static pressures exerted by the stored material when this latter forms a limited heap 9 above the level a of the top emptying orifice 7 of the vertical tube 5. Finally, curve V represents the static pressures of curve IV to which are assigned the discharge increase coefficient or in other words the curve of overpressure of discharge of the material forming the limited heap 9 when the second discharge orifice 4 is open and permits complete emptying of the vessel 1. It is observed that said curve V representing the highest stresses exerted on the wall remains below the curve II and even below curve I if the level a of the emptying orifice 7 of the tube 5 is fixed at a suitable height for ensuring that the curve V is tangent to said curve I at a maximum.

Under these conditions, the vessel wall does not require any reinforcement, in distinct contrast to the situation which would have arisen if the vessel wall had been required to withstand discharge pressures such as those represented by curve II or by a curve V of intermediate value between curve I and curve II. In order to obtain the desired result or in other words in order to avoid any need to provide a wall reinforcement, it is only necessary to ensure that the top emptying orifice of the vertical tube 5 is located at a level a such that the curve of overpressures produced by a second-stage emptying operation is close to the curve of static pressures produced by the entire quantity of material stored within the vessel when this latter is completely full.

It has been established as a result of experiments and calculations that said level a must be located between ⅛ and ⅜ of the total height of the vertical tube 5. In point of fact, this level is preferably located substantially at one-half the total height in order to obtain the best result.

Thus in the case of a silo having a total height of 40 m, the top emptying orifice 7 of the vertical tube 5 is located at a height of approximately 20 m. A value of this order permits maximum reduction of the reinforcements which are necessary (as shown in FIG. 6).

However, results which still remain advantageous are obtained when this level is located at ¼ of the total height or else at ¾ of said height; these values correspond to the limits between which the top emptying orifice 7 of the vertical tube 5 may be located. This results from the curve of FIG. 6 which represents the variations in the percentage of economy of construction as a function of the position of the level of the emptying orifice 7. This curve has been established on the basis of the method of calculation of walls of silos and storage vessels as defined by the American Concrete Institute and designated by the reference ACI 313-77. This method has been applied to the calculation of reinforcements to be contemplated by reason of overpressures produced during the final emptying stage and in respect of different heights of the quantity of material involved in said final stage.

In an alternative form of construction of the storage vessel in accordance with the invention, provision is made for two vertical emptying tubes connected to two separate discharge openings provided in addition to the bottom opening 4 of the lower end of said vessel. In this case, the top emptying orifices of said two tubes are located at different levels. In the example under consideration, and as will be explained hereinafter with reference to another form of construction, one of said orifices must be located at a level within the range of ⅜ to 4/8 of the total height of the vessel whilst the other orifice is located at a level within the range of ⅝ to ⅞ of said height.

Figure 4:
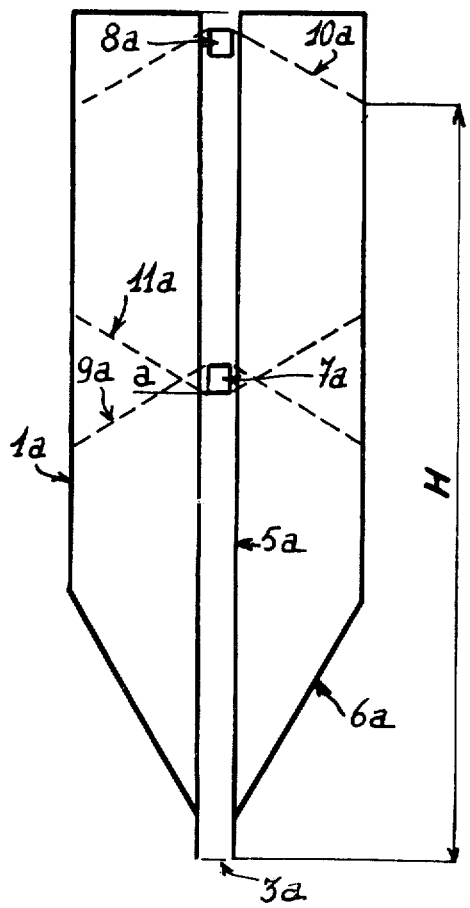
FIG. 4 is a vertical sectional view taken along the plane CD of FIG. 3.

FIGS. 3 and 4 illustrate another embodiment of the storage vessel under consideration which is so designed as to improve the conditions of filling of the vessel.

To this end, the vertical emptying tube 5a of the corresponding vessel 1a extends above its emptying orifice 7a which is located at a level within the range of ¼ to ¾ of the total height of the vessel as described earlier with reference to FIGS. 1 and 2. By virtue of this extension, the upper end of said tube can be connected to the filler opening 2a of the vessel 1a. But provision is made at the upper end of said tube for a top orifice 8a having a design function which will hereinafter become apparent. As can readily be understood, the vertical emptying tube 5a is connected to a bottom discharge opening 3a which is separate from the opening 4a provided at the bottom of the lower end 6a of the vessel.

By virtue of this arrangement, filling of the vessel takes place in two stages. In an initial stage, the grains poured into the vertical tube 5a are discharged from this latter via the orifice 7a which is normally provided for the emptying operation. This discharge takes place as soon as said grains have filled the lower portion of said tube. Under these conditions, since the orifice 7a is located at an intermediate point of the height of the vessel, the height of free fall of the grains is considerably reduced in comparison with the height of free fall which would have existed if the grains had been poured directly into the vessel from the filler opening 2a. The grains thus fill the entire lower portion of the vessel up to the level of the emptying orifice 7a of the vertical tube 5a. They then form a heap 9a, the top surface of which has a conical shape.

The orifice 7a is thus closed-off and the grains which continue to be admitted through the filler opening 2a then fill the vertical tube 5a up to the level of its top outlet orifice 8a. From this moment onwards, the grains escape from the vertical tube 5a via the top orifice 8a of this latter, then pass into the interior of the storage vessel which continues to be filled above the heap 9a. But in this case also, the height of free fall is of small value since it corresponds only to a fraction of the height of the vessel. Finally, the grains form a heap 10a having a conical top surface as was the case with the heap 9.

By virtue of this particular mode of filling, the maximum possible height of free fall of grains is reduced to a considerable extent. This has the effect of lessening and even completely removing any danger of breakage of grains or damage to these latter at the point of impact.

In regard to emptying of the vessel, this operation is carried out under the same conditions as in the case of the embodiment shown in FIGS. 1 and 2. Under these conditions, this vessel has the same advantages, with the result that the vessel wall does not require any special or substantial reinforcement in order to be capable of affording resistance to particular overpressures produced at the time of emptying.

Figure 7:
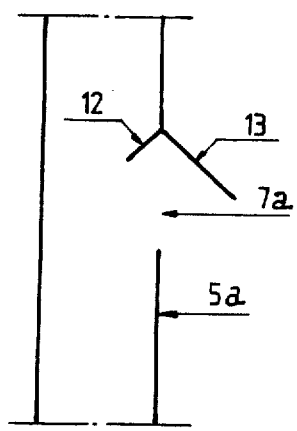
FIG. 7 is a fragmentary sectional view showing a detail of a filling and emptying tube provided in a vessel in accordance with the invention.

By way of additional equipment, it is possible to provide each top edge of the orifices 7a and 8a of the vertical tube 5a with a deflecting plate 12 which extends into the interior of said tube (as shown in FIG. 7). Said plate 12 thus produces a braking action on the grains at the time of filling, thus damping their falling motion to an even greater extent.

Moreover, the orifice 7a can be provided at the top edge thereof with a deflector 13 which extends into the interior of the vessel 1a. This deflector has the design function of completely preventing the grains from passing into the lower portion of the tube 5a as long as the level of the grains which are being discharged and which had formed part of the upper layers has not reached the level of the bottom portion of the deflector.

FIG. 10 shows another embodiment in which provision is made for two vertical filling and emptying tubes designated respectively by the references 5b and 5c. These tubes are connected to two discharge openings 3b and 3c each fitted with a separate shut-off valve, the lower end of the vessel being provided with another discharge opening 4b which is also fitted with a shut-off valve.

The emptying orifices 7b and 7c of the two vertical tubes 5b and 5c are located at different levels at intermediate points of the total height of the vessel.

Taking into account the experiments and calculations which have been made, the levels of the orifices mentioned above must be located respectively between ⅜ and 4/8 of the total height of said tubes as considered from the lower end in the case of the uppermost orifice 7b, and between ⅜ and ⅛ of the total height as considered from the lower end in the case of the lowermost orifice 7c. Preferably, these two orifices are located at ⅜ and at ⅛ of the height as considered from the lower end, the most advantageous results being obtained in these positions.

Furthermore, one of the two vertical tubes, namely the tube 5b in the example shown, is provided at its upper end with an outlet orifice 8b having the same function as the orifice 8a which is provided in the embodiment shown in FIGS. 3 and 4.

In the case under consideration, the filling operation can be performed in several stages.

In a first stage, the initial step consists in pouring the grains into the second vertical tube 5c whose intermediate orifice 7c is located at the lowest level, this operation being performed by shutting-off the upper end of the first vertical tube 5b. During this first phase, the grains fall into the bottom of the corresponding vessel 1b from the intermediate orifice 7c of the tube thus employed for the filling operation. This results in a further reduction in the height of free fall of the grains with respect to the height of free fall existing in the preceding embodiment. When the lower portion of the vessel is filled up to the level of the intermediate orifice 7c of the second vertical tube 5c, the upper end of the first vertical tube 5b is then opened in order to pour the grains through said tube. The grains then fall into the vessel from the intermediate orifice 7b of said tube, with the result that their height of fall is of small value. When the vessel is filled up to the level of the intermediate orifice 7b, the grains then fall into the vessel from the top orifice 8b of the tube 5b as described earlier.

The emptying operation can also be carried out in several stages. The initial stage consists in carrying out an emptying operation by means of the first vertical tube 5b whose intermediate orifice 7b is located at the highest level, this being achieved by leaving both the valve of the opening 4b of the lower end of the vessel and the valve of the discharge opening 3c of the vertical tube 5c in the closed position. However, when the level of grains within the vessel has fallen to the level of the intermediate orifice 7b of the first vertical tube 5b, the valve of the discharge opening 3c of the second vertical tube 5b is opened while maintaining the valve of the opening 4b of the lower end of the vessel in the closed position. The grains then flow through the second vertical tube 5c until the top grain surface reaches the level of the intermediate orifice 7c of said tube, whereupon the emptying operation can be completed by opening the valve of the bottom opening 4b of the vessel.

An emptying operation which is thus carried out in several stages has the advantage of further reducing overpressures which are liable to develop during this operation.

Figure 8:
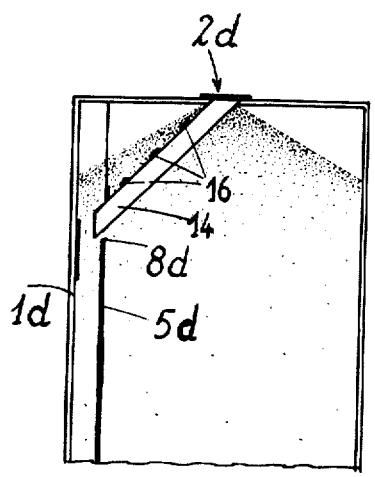
FIG. 8 is a fragmentary vertical sectional view showing another alternative embodiment of the storage vessel under consideration.
Figure 9:
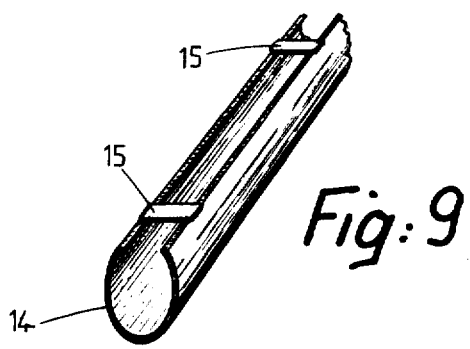
FIG. 9 is a view in perspective showing the connecting duct provided in this alternative embodiment at the top of the corresponding vessel.

However, many other alternative embodiments and forms of construction may be contemplated. Thus FIGS. 8 and 9 illustrate an alternative form of the embodiment shown in FIGS. 3 and 4 in which the single filling and emptying tube 5d is placed against the wall of the corresponding storage vessel 1d. In this instance, the upper end of said tube can be connected to the single filler opening 2d by means of an inclined duct 14, a slit 15 being formed in the top portion of said duct.

Said slit extends along the entire length of said duct and a certain number of distance-pieces 16 are mounted astride the slit on the edges of this latter in order to prevent any danger of deformation of the duct. The slit thus provided makes it possible for the grains to flow out of the duct 14 at the end of the filling operation so as to fill the top portion of the storage vessel 1a. In fact, were it not for the presence of said slit, filling of the vessel 1 would be limited to the level of the top orifice 8d of the vertical tube 5d.

What is claimed is:

1. A vessel for the storage of materials in granular or powdered form in which a bottom discharge opening is formed in the lower end of said vessel and fitted with a shut-off valve, wherein the lower end of said vessel is provided with a second discharge opening fitted with a shut-off valve, there being connected to said second discharge opening a vertical emptying tube which extends within the vessel and the top orifice of which is located at a level between ¼ and ¾ of the total height of the vessel, said level being such that, at the time of final emptying of the lower portion of the vessel through the discharge opening in the lower end of said vessel, the curve of overpressures resulting from said emptying operation is close to the curve of static pressures generated by all the material stored within the vessel when said vessel is full.

2. A storage vessel according to claim 1, wherein the level of the top orifice of the vertical emptying tube is located at a level corresponding substantially to one-half the total height of said vessel.

3. A storage vessel according to claim 1 or claim 2, wherein the vertical tube extends above the emptying orifice thereof which is located at a level between ¼ and ¾ of the total height of said vessel and preferably at one-half said height, the upper end of said vertical tube being connected to a single filler opening provided in the top end-wall of the vessel whilst an outlet orifice is formed in the vertical tube near the upper end thereof.

4. A method for emptying a storage vessel according to claim 1 or claim 2, wherein the emptying operation is carried out in two stages, viz:

a first stage during which the discharge opening provided at the lower end of the vertical emptying tube is opened while the other discharge opening provided in the lower end of the vessel is maintained in the closed condition until the quantity of material located above the emptying orifice of the vertical tube has been completely discharged from said tube via said orifice;

a second stage during which the discharge opening provided in the lower end of the vessel is opened in order to discharge through said opening the material contained in the vessel below the level of the emptying orifice of the vertical tube.

5. A vessel for the storage of materials in granular or powdered form in which a bottom discharge opening is formed in the lower end of said vessel and fitted with a shut-off valve, wherein the lower end of said vessel is provided with a second discharge opening fitted with a shut-off valve, there being connected to said second discharge opening a vertical emptying tube which extends within the vessel and the top orifice of which has a level such that, at the time of final emptying of the lower portion of the vessel through the discharge opening in the lower end of said vessel, the curve of overpressures resulting from said emptying operation is close to the curve of static pressures generated by all the material stored within the vessel when said vessel is full, the lower end of said vessel having a third discharge opening fitted with a shut-off valve, there being connected to said third discharge opening a second vertical emptying tube which extends within the vessel and the top orifice of which is located at a level between ⅛ and ⅜ of the total height of said vessel from the bottom end thereof whilst the top orifice of the first vertical emptying tube is accordingly located at a level between ⅜ and 4/8 of the total height of the vessel from the bottom end thereof.

6. A storage vessel according to claim 5, wherein the levels of the top orifices of the two vertical emptying tubes correspond substantially to ⅛ and ⅜ of the total height of the vessel from the top end thereof.

7. A storage vessel according to claim 5 or claim 6, wherein the two vertical tubes extend above their emptying orifice and the upper ends of said tubes are each connected to a filler opening provided in the top end-wall of the vessel whilst an outlet orifice is formed in one of the two vertical tubes near the upper end of said vertical tube.

8. A method for emptying a storage vessel according to claim 5 or claim 6, wherein the emptying operation is carried out in three stages, viz:
  a first stage during which the discharge opening provided at the lower end of the first vertical tube is opened while the other two discharge openings are maintained in the closed condition until the quantity of material located above the emptying orifice of the first vertical tube has been completely discharged from said tube via said orifice;
  a second stage during which the discharge opening provided at the lower end of the second vertical tube is opened while the discharge opening provided in the lower end of the vessel is maintained in the closed condition until the quantity of material stored above the emptying orifice of the second vertical tube has been completely discharged from said tube via said orifice;
  a third stage during which the discharge opening provided in the lower end of the vessel is opened in order to discharge through said opening the material contained in the vessel below the level of the emptying orifice of the second vertical tube.

* * * * *